J. K. BRUGLER.
PORTABLE CHUTE FOR DIRECTING WATER TO CURRENT MOTORS.
APPLICATION FILED FEB. 3, 1909.
946,104.
Patented Jan. 11, 1910.
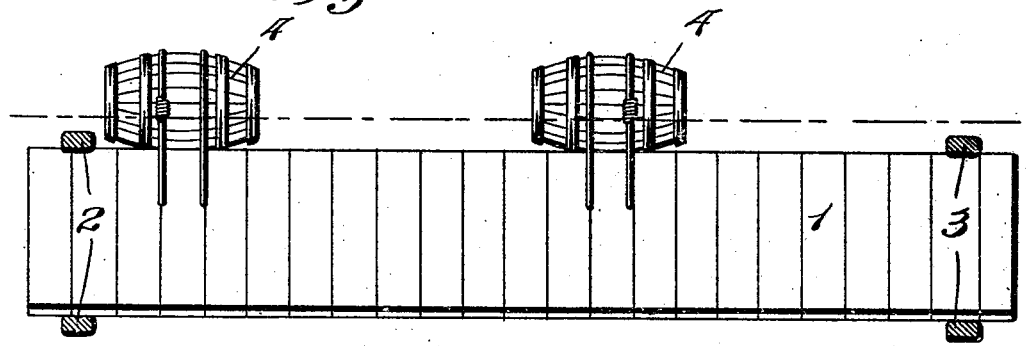
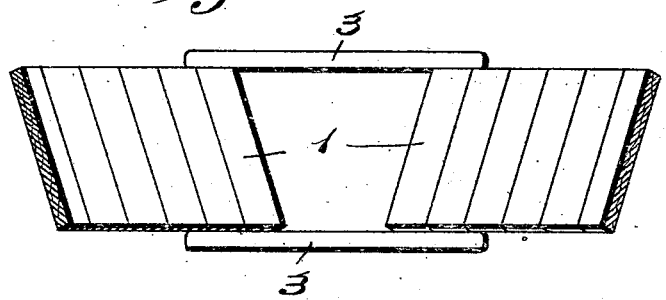
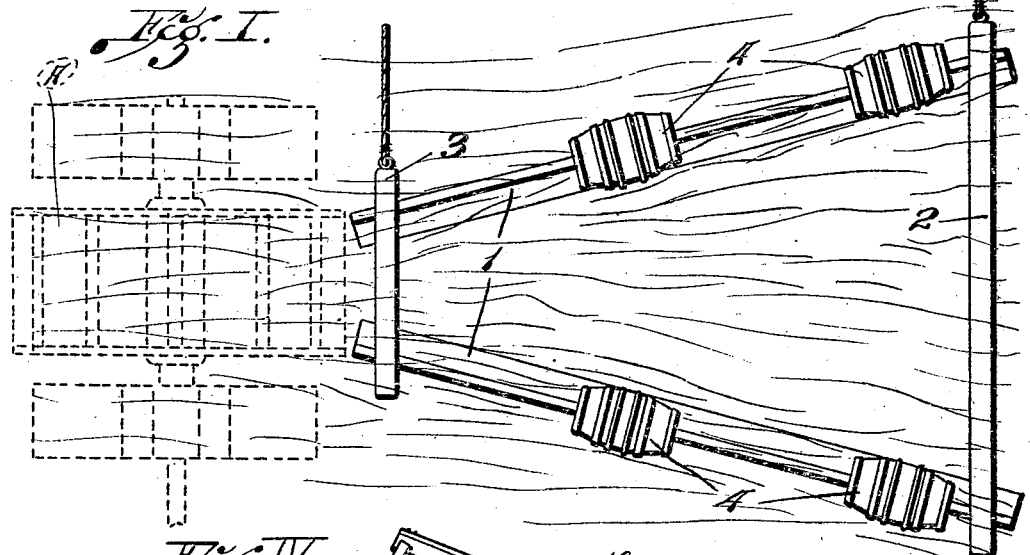
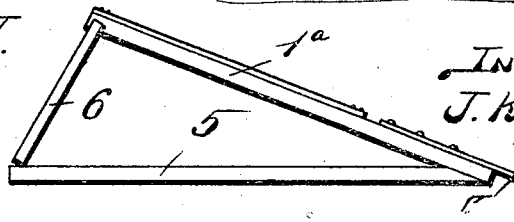
ATTEST.
INVENTOR.
J. K. BRUGLER.

UNITED STATES PATENT OFFICE.

JAMES K. BRUGLER, OF ST. LOUIS, MISSOURI.

PORTABLE CHUTE FOR DIRECTING WATER TO CURRENT-MOTORS.

946,104.  Specification of Letters Patent.  Patented Jan. 11, 1910.

Application filed February 3, 1909. Serial No. 475,894.

*To all whom it may concern:*

Be it known that I, JAMES K. BRUGLER, a citizen of the United States of America, residing in the city of St. Louis and State of Missouri, have invented certain new and useful Improvements in Portable Chutes for Directing Water to Current-Motors, of which the following is a full, clear, and exact description, reference being had to the accompanying drawings, forming part of this specification.

My invention relates to a portable chute for use in rivers or streams in such manner as to cause the full force of the current in the body of water to be delivered to the current motor.

The object of the invention is to provide a chute of the kind named so constructed as to cause the water to exert a downward pressure thereon whereby the chute is held beneath the surface of the body of water in which it is placed.

Figure I is a top or plan view of my chute, with a current motor in position in a river illustrated in dotted lines in front of the chute. Fig. II is an enlarged longitudinal section through the chute. Fig. III is an enlarged cross section through the chute. Fig. IV is a top or plan view illustrating a modification.

In the accompanying drawings:—A designates a current motor that may be of any ordinary or desired description and to which a current of water in the river or stream is directed in the use of my chute.

1 designates the side members or walls of my chute that are connected by cross pieces 2 and 3 attached to the upper and lower edges of the side members. The side members 1 are placed at angles to each other whereby the chute is rendered of funnel shape with a rear end that is wider than the other end. For the purpose of causing the chute to be held depressed in the body of water in which it floats adjacent to the current motor, I so dispose the side members of the chute as to have them slant downward and inwardly toward each other, as seen in Figs. I and III, in order that the current of water flowing through the chute may exert a downward pressure upon the side members and prevent the upward movement thereof.

The side members of the chute have secured to them, by any suitable means, floats 4, preferably in the form of barrels, the floats being located above the side members and being adapted to furnish only sufficient buoyancy to sustain the chute to a degree that will permit of the downward pressure of the water current holding the chute beneath the water line in a river or stream, as indicated in Fig. II, wherein the dotted line above the chute indicates the level of the water.

In Fig. IV I have shown a modification of my chute. This modified form of the chute is designed to be used upon the bed of a river or stream in which the water is of shallow depth and where there is necessity for having the chute floatably suspended in the water. The device shown in Fig. IV constitutes only one-half of the chute, there being a companion section of like construction adapted to be associated with the section shown. Each section in this modification comprises a water directing wall 1ª that is sloped downwardly in a manner corresponding to the sloping of the side members or walls of the chute previously described, a back wall 5 arranged at an angle to the water directing wall, and a brace 6 interposed between said walls at their separated ends. The sections just described are designed to be laid upon the bed of a river or stream separated from each other so that their water directing walls are disposed relative to each other in the same manner as that in which the walls 1 of the previously described chute are arranged, and the current flowing between the two sections acts by downward pressure upon the water directing walls to hold the sections in position upon the bed upon which they rest. Each section is preferably provided with an anchor arm 7 that may be forced into the bed of the river or stream and act to hold the section from creeping on said bed.

I claim:—

1. A chute of the character described, comprising a pair of side walls arranged at angles to each other, having their inner faces slanted downwardly and inwardly toward each other, and means whereby said side walls are rigidly connected to each other.

2. A chute of the character described, comprising a pair of side walls arranged at angles to each other, having their inner faces slanted downwardly and inwardly toward each other, means whereby said side walls are connected to each other, and floats for sustaining said side walls.

JAS. K. BRUGLER.

In the presence of—
H. G. Cook,
E. M. Harrington.